(12) United States Patent
Moon et al.

(10) Patent No.: US 8,150,174 B2
(45) Date of Patent: Apr. 3, 2012

(54) METHOD AND APPARATUS FOR ENCODING AND DECODING MULTI-VIEW IMAGE

(75) Inventors: Young-ho Moon, Suwon-si (KR);
Woo-sung Shim, Yongin-si (KR);
Hak-sup Song, Suwon-si (KR);
Jong-bum Choi, Yangju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1021 days.

(21) Appl. No.: 12/103,134

(22) Filed: Apr. 15, 2008

(65) Prior Publication Data

US 2008/0285863 A1 Nov. 20, 2008

Related U.S. Application Data

(60) Provisional application No. 60/917,753, filed on May 14, 2007, provisional application No. 60/947,097, filed on Jun. 29, 2007.

(30) Foreign Application Priority Data

Jul. 4, 2007 (KR) ........................ 10-2007-0067142
Sep. 28, 2007 (KR) ........................ 10-2007-0098359

(51) Int. Cl.
*G06K 9/36* (2006.01)
*H04N 7/00* (2011.01)

(52) U.S. Cl. .......... 382/232; 382/154; 382/276; 348/36; 348/42

(58) Field of Classification Search .................. 382/154, 382/232–253, 276, 284, 285, 294; 348/36–39, 348/42–60
See application file for complete search history.

(56) References Cited

U.S. PATENT DOCUMENTS

| | | | |
|---|---|---|---|
| 5,754,704 A * | 5/1998 | Barnsley et al. .............. | 382/249 |
| 6,043,838 A | 3/2000 | Chen | |
| 7,463,778 B2 * | 12/2008 | Damera-Venkata ......... | 382/236 |
| 7,817,865 B2 * | 10/2010 | Yang .............................. | 382/233 |
| 7,817,866 B2 * | 10/2010 | Yang .............................. | 382/233 |
| 7,822,279 B2 * | 10/2010 | Ha et al. ........................ | 382/232 |
| 2006/0013297 A1 | 1/2006 | Suzuki et al. | |
| 2006/0146143 A1 | 7/2006 | Xin et al. | |

FOREIGN PATENT DOCUMENTS

| | | |
|---|---|---|
| JP | 2002027495 A | 1/2002 |
| KR | 107073713 B1 | 3/2007 |

* cited by examiner

*Primary Examiner* — Manav Seth
(74) *Attorney, Agent, or Firm* — Sughrue Mion, PLLC

(57) ABSTRACT

A method and apparatus for encoding and decoding a multi-view image for a multi-view display apparatus are provided. The method of encoding a multi-view image includes: compressing a multi-view image based on a reference image relative to multiple views; generating enabled stereo pair information in relation to multi-view images; and generating a bitstream by using the compressed multi-view image and the enabled stereo pair information.

22 Claims, 14 Drawing Sheets

FIG. 7

| nal_unit( NumBytesInNALunit ) { | C | Descriptor |
|---|---|---|
|   forbidden_zero_bit | All | f(1) |
|   nal_ref_idc | All | u(2) |
|   nal_unit_type | All | u(5) |
|   NumBytesInRBSP = 0 | | |
|   for( i = 1; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

FIG. 8

| nal_unit_type | Content of NAL unit and RBSP syntax structure | C |
|---|---|---|
| 0 | Unspecified | |
| 1 | Coded slice of a non-IDR picture<br>slice_layer_without_partitioning_rbsp( ) | 2, 3, 4 |
| 2 | Coded slice data partition A<br>slice_data_partition_a_layer_rbsp( ) | 2 |
| 3 | Coded slice data partition B<br>slice_data_partition_b_layer_rbsp( ) | 3 |
| 4 | Coded slice data partition C<br>slice_data_partition_c_layer_rbsp( ) | 4 |
| 5 | Coded slice of an IDR picture<br>slice_layer_without_partitioning_rbsp( ) | 2, 3 |
| 6 | Supplemental enhancement information (SEI)  sei_rbsp( ) | 5 |
| 7 | Sequence parameter set<br>seq_parameter_set_rbsp( ) | 0 |
| 8 | Picture parameter set<br>pic_parameter_set_rbsp( ) | 1 |
| 9 | Access unit delimiter<br>access_unit_delimiter_rbsp( ) | 6 |
| 10 | End of sequence<br>end_of_seq_rbsp( ) | 7 |
| 11 | End of stream<br>end_of_stream_rbsp( ) | 8 |
| 12 | Filler data<br>filler_data_rbsp( ) | 9 |
| 13 | Sequence parameter set extension<br>seq_parameter_set_extension_rbsp( ) | 10 |
| 14..18 | Reserved | |
| 19 | Coded slice of an auxiliary coded picture without partitioning<br>slice_layer_without_partitioning_rbsp( ) | 2, 3, 4 |
| 20..23 | Reserved | |
| 24..31 | Unspecified | |

| sei_message( ) { | C | Descriptor |
|---|---|---|
| payloadType = 0 | | |
| while( next_bits( 8 ) == 0xFF ) { | | |
| ff_byte /* equal to 0xFF */ | 5 | f(8) |
| payloadType += 255 | | |
| } | | |
| last_payload_type_byte | 5 | u(8) |
| payloadType += last_payload_type_byte | | |
| payloadSize = 0 | | |
| while( next_bits( 8 ) == 0xFF ) { | | |
| ff_byte /* equal to 0xFF */ | 5 | f(8) |
| payloadSize += 255 | | |
| } | | |
| last_payload_size_byte | 5 | u(8) |
| payloadSize += last_payload_size_byte | | |
| sei_payload( payloadType, payloadSize ) | 5 | |
| } | | |

FIG. 11A

| stereo_pair_picture_set( payloadSize ) { | C | Descriptor |
|---|---|---|
| for( i = 0; i <= num_views_minus_1; i++ ) { | | |
| for( j = 0; j <= num_views_minus_1; j++ ) { | | |
| enable_stereo_pair_flag[ i ][ j ] | 5 | u(1) |
| } | | |
| } | | |
| } | | |

FIG. 11B stereo-pair picture set SEI message semantic enable_stereo_pair_flag[ i ][ j ] equal to 1 indicates that
there are enable stereo pair. [i] is left view_id and [j] is right view_id.
That view_id equal to view_id[i] in SPS.
It equal to 0 indicates that there are disable stereo pair.
It contain the vertical pair, the long distance pair, the left and
right view false and the same left and right view case.

| | enable_stereo_pair_flag[ i ][ j ] (num_views_minus_1 == 7, 4*2 2D array) | |
|---|---|---|

| View_id[i] | View_id[j] | Flag |
|---|---|---|
| 0 | 0 | 0 (i==j) |
| 0 | 1 | 1 |
| 0 | 2 | 1 |
| 0 | 3 | 0 (so far) |
| 0 | 4 | 0 (vertical) |
| 0 | 5 | 0 (vertical) |
| 0 | 6 | 0 (vertical) |
| 0 | 7 | 0 (vertical) |
| 1 | 0 | 0 (left and right false) |
| 1 | 1 | 0 (i=j) |
| 1 | 2 | 1 |
| 1 | 3 | 1 |
| 1 | 4 | 0 (vertical) |
| 1 | 5 | 0 (vertical) |
| 1 | 6 | 0 (vertical) |
| 1 | 7 | 0 (vertical) |

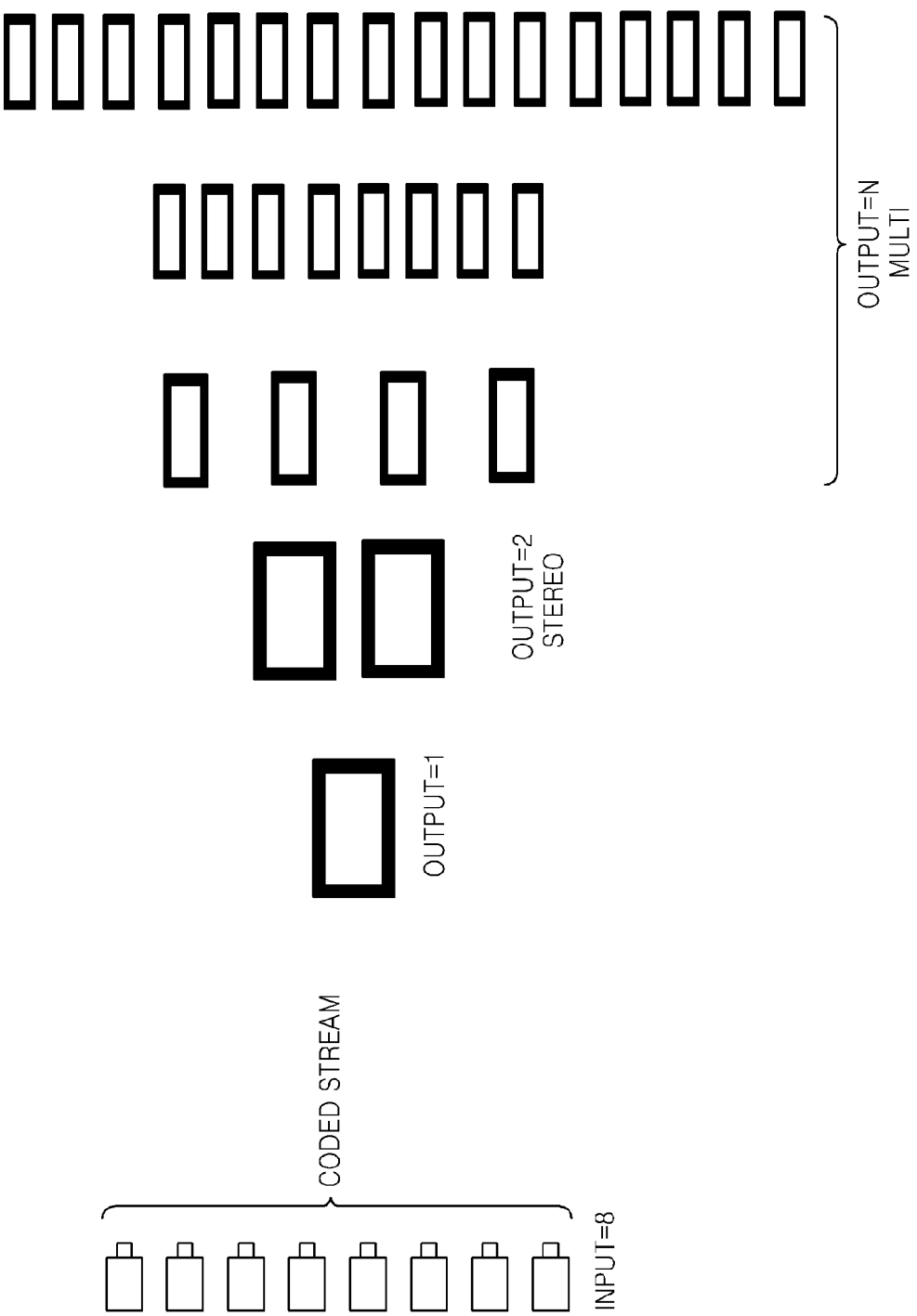

METHOD AND APPARATUS FOR ENCODING AND DECODING MULTI-VIEW IMAGE

CROSS-REFERENCE TO RELATED PATENT APPLICATIONS

This application claims priority from Korean Patent Application No. 10-2007-0067142 filed on Jul. 4, 2007, Korean Patent Application No. 10-2007-0098359 filed on Sep. 28, 2007, U.S. Provisional Patent Application No. 60/917,753 filed on May 14, 2007, and U.S. Provisional Patent Application No. 60/947,097 filed on Jun. 29, 2007 the disclosures of which are incorporated herein in their entirety by reference.

BACKGROUND OF THE INVENTION

1. Field of the Invention

Apparatuses and methods consistent with the present invention relate to processing a multi-view image, and more particularly, to encoding and decoding a multi-view image for a multi-view display apparatus.

2. Description of the Related Art

A multi-view image processing system geometrically corrects images taken through a plurality of cameras and performs spatial synthesis and other processes, thereby providing a variety of views in multiple directions to users.

Multi-view image encoding and decoding standards normally utilize An H.264 or multi-view coding (MVC) codec generally utilizes multi-view image encoding and decoding standards.

In multi-view image encoding, images input through a plurality of cameras providing multi-view images are encoded at the same time. Also, the multi-view image is encoded as a compressed stream, by using temporal dependency and the cameras' inter-view spatial dependency.

The compressed stream is displayed on a display apparatus according to the performance of a decoder and selection by a user.

The display apparatus appropriately decodes an input image in consideration of the dependency between views, and displays the decoded image on a screen. In this case, the display apparatus can display the image by using a desired single view, or can display a stereo image, by using two views.

Also, a display apparatus which usually supports one view displays a plurality of views, by switching from one view to another view from among the plurality of views.

However, a multi-view display apparatus which supports a plurality of views should form a stereo pair image in order to achieve a stereo effect.

In this exemplary embodiment, when a stereo image is formed by selecting two views, it is efficient for the multi-view display apparatus to select a pair of images in which the left view and the right view have a proper distance from each other in order to achieve a stereo effect. The multi-view display apparatus, however, cannot achieve a stereo effect between two vertically positioned views.

However, multi-view display apparatuses in the related art cannot specify a pair of images, and cause delays in order to sequentially form pairs with a plurality of views.

SUMMARY OF THE INVENTION

The present invention provides a method and apparatus for encoding a multi-view image capable of forming an effective stereo image, by defining stereo pair information in an H.264 or multi-view coding (MVC) codec.

The present invention also provides a method and apparatus for decoding a multi-view image capable of forming an effective stereo image, by extracting enabled stereo pair information from an H.264 or MVC codec.

The present invention also provides a method and apparatus for displaying a multi-view image capable of forming an effective stereo image, by providing and receiving stereo pair information in an H.264 or MVC codec.

According to an aspect of the present invention, there is provided a method of encoding a multi-view image including: compressing a multi-view image based on a reference image relative to multiple views; generating enabled stereo pair information in relation to the multi-view images; and generating a bitstream of a predetermined transmission unit by using the compressed multi-view image and the enabled stereo pair information.

According to another aspect of the present invention, there is provided a method of decoding a multi-view image including: extracting compression data and a predetermined user-defined information message from a bitstream; decoding a multi-view image from the compression data, and extracting enabled stereo pair information from the predetermined user-defined information message; and selecting a view image corresponding to the extracted enabled stereo view pair, and decoding the selected stereo views.

According to another aspect of the present invention, there is provided a method of displaying a multi-view image including: determining whether or not a display mode is a stereo view display mode; if the display mode is the stereo view mode, extracting a predetermined user-defined message from a received bitstream; detecting information on a pair-set that enables stereo pairs from the user-defined message; setting a stereo image from the information on the pair-set that enables stereo pairs; and decoding the stereo image of the set pair-set according to a multi-view decoding algorithm, and displaying the decoded stereo view.

According to another aspect of the present invention, there is provided an apparatus for encoding a multi-view image including: a signal encoder unit compressing a multi-view image by using a multi-view compression algorithm, and encoding the compressed multi-view image signal; an SEI message generation unit generating enabled stereo pair information of the multi-view images, and syntax of an SEI message; and a bitstream generation unit generating a bitstream of a predetermined transmission unit, with the multi-view image encoded in the signal encoder unit and the enabled stereo pair information generated in the SEI message generation unit.

According to another aspect of the present invention, there is provided an apparatus for decoding a multi-view image including: a bitstream interpretation unit separating an NAL header part and a data part from a bitstream; an SEI extraction unit extracting an SEI message from the NAL header part separated by the bitstream interpretation unit; a signal decoder unit decoding a multi-view image signal related to a selected view, by using a multi-view signal decoding method; and a control unit detecting information on enabled stereo pairs in relation to multi-view images from the SEI message extracted by the SEI extraction unit, and providing a view selection signal corresponding to the stereo pair information, to the signal decoder unit.

BRIEF DESCRIPTION OF THE DRAWINGS

The above and other aspects of the present invention will become more apparent by describing in detail exemplary embodiments thereof with reference to the attached drawings in which:

FIG. 7 is a diagram illustrating syntax of an ordinary network abstraction layer (NAL) unit according to an exemplary embodiment of the present invention;

FIG. 8 is a diagram illustrating types of an NAL unit illustrated in FIG. 7 according to an exemplary embodiment of the present invention;

FIG. 11A is a diagram illustrating an SEI message syntax for setting a stereo-pair image according to an exemplary embodiment of the present invention;

FIG. 11B is a diagram illustrating SEI message semantic information for setting a stereo-pair image according to an exemplary embodiment of the present invention;

FIG. 13 is a conceptual diagram illustrating a multi-view image display according to an exemplary embodiment of the present invention.

DETAILED DESCRIPTION OF THE EXEMPLARY EMBODIMENTS

The present invention will now be described more fully with reference to the accompanying drawings, in which exemplary embodiments of the present invention are shown.

Figure 1A:
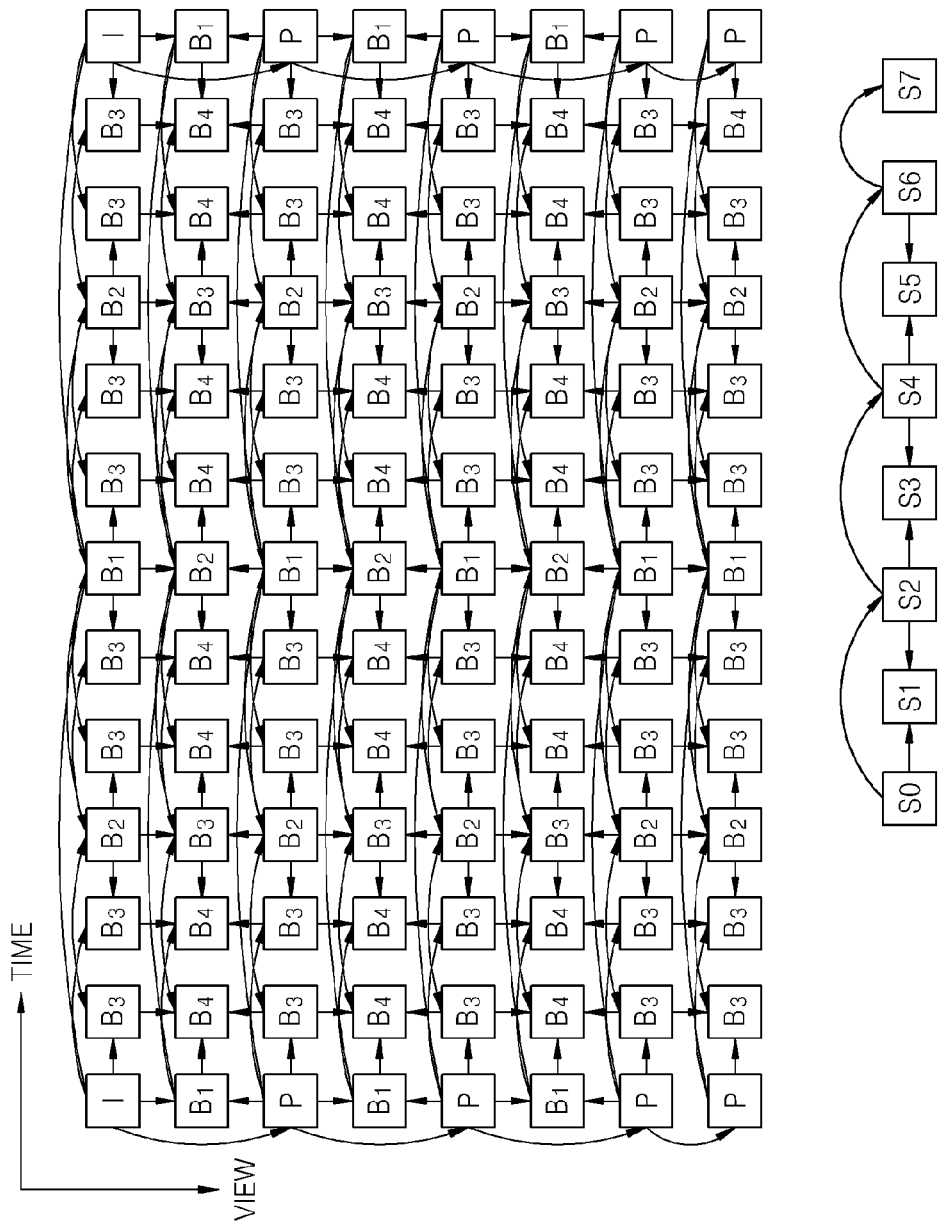
FIG. 1A is a diagram illustrating a multi-view image sequence of an ordinary MVC standard in a one-dimensional camera array structure according to the related art.

FIG. 1A is a diagram illustrating an ordinary multi-view image sequence in a one-dimensional (1D) camera array structure according to the related art.

For example, in the 1D camera array structure, eight cameras may generate eight views.

Referring to FIG. 1A, the horizontal axis is a time axis, and the vertical axis is a view axis. In multi-view coding, an intra picture (I picture) is periodically generated in relation to an image of a basic view, and based on the generated intra pictures, temporal prediction or inter-view prediction is performed, thereby prediction-encoding other pictures.

The temporal prediction uses temporal dependency between images on a same line, and the inter-view prediction uses spatial dependency between images at a same time, i.e., on a same column.

Referring to FIG. 1A, each line illustrates the image sequence of each view of a multi-view image with the passage of time. Starting from the top line, the lines sequentially become the image sequences of view 0 (S0), view 1 (S1), view 2 (S2), etc., respectively.

Here, the view 0 (S0) is assumed to be a basic view, and therefore, the image sequence of the first line becomes the image sequence of the basic view. The pictures included in the image sequence of the basic view are prediction-encoded by performing only temporal prediction, rather than inter-view prediction.

Also, each column illustrates multi-view images at an identical time. Pictures included in a column, including an intra picture, among the illustrated columns are referred to as anchor pictures. The anchor pictures are encoded by performing only inter-view prediction.

Referring to FIG. 1A, the apparatus for encoding a multi-view image encodes an image with reference to a predetermined image unit. First, the first picture of each view is prediction-encoded. Based on an intra picture which is generated at a reference time, inter-view prediction is performed, thereby generating the first picture of each view.

By using one-way inter-view prediction, P pictures for images of view 2 (S2), view 4 (S4), view 6 (S6), and view 7 (S7) are generated. By using two-way inter-view prediction, B pictures for images of view 1 (S1), view 3 (S3), and view 5 (S5) are generated. Prediction of each of the first pictures is performed based on an intra picture generated in relation to an image of a basic view.

Figure 1B:
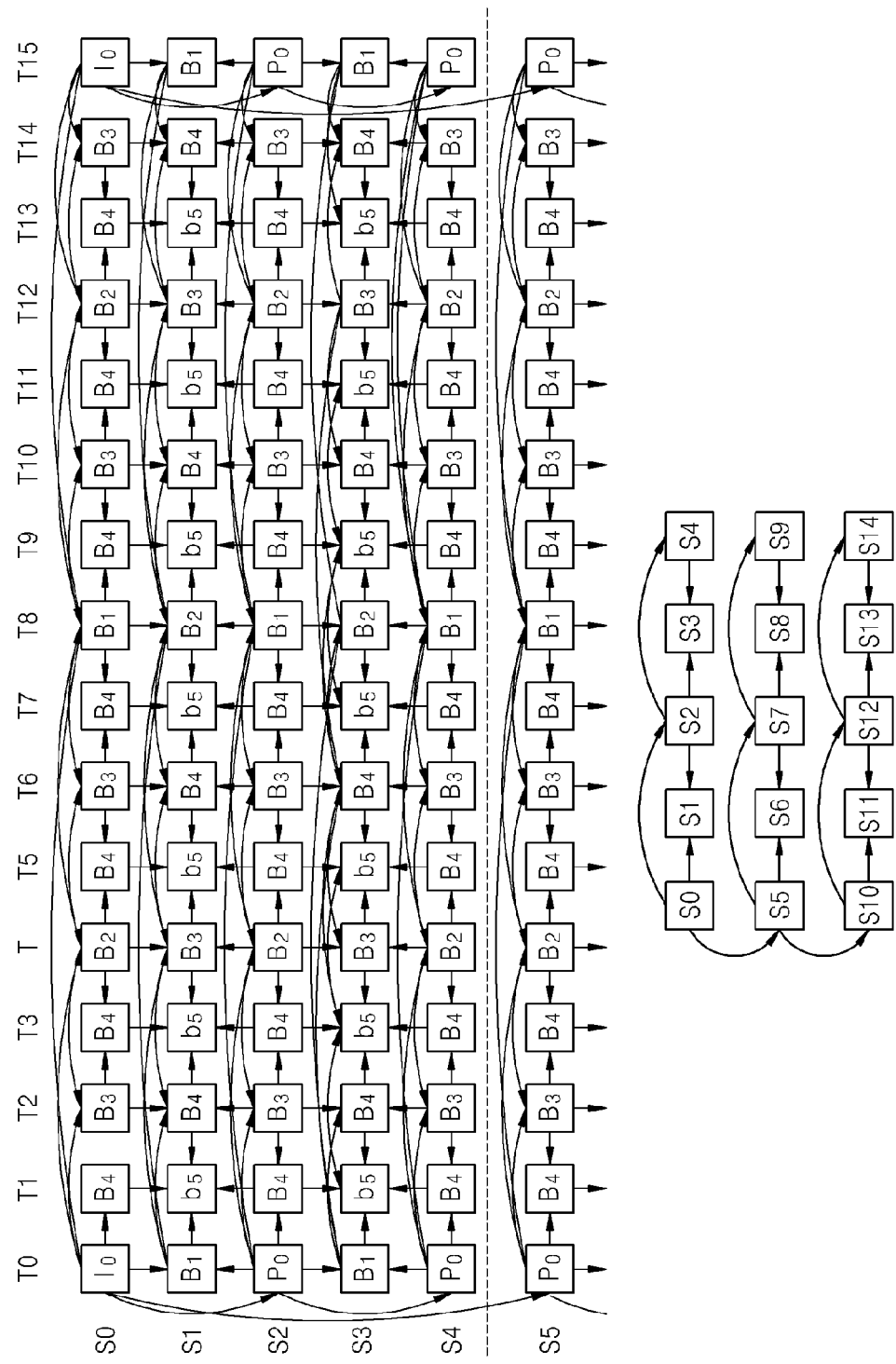
FIG. 1B is a diagram illustrating a multi-view image sequence of an ordinary MVC standard in a 2-dimensional (2D) camera array structure according to the related art.

FIG. 1B is a diagram illustrating an ordinary multi-view image sequence in a two-dimensional (2D) camera array structure according to the related art. For example, in a 2D camera array structure, 15 cameras may generate 15 views.

P pictures of the images of view 2 (S2), view 4 (S4), view 5 (S5), view 7 (S7), view 9 (S9), view 10 (S10), view 12 (S12), and view 14 (S14) are generated by using one-way inter-view prediction. B pictures of the images of view 1 (S1), view 3 (S3), view 6 (S6), view 8 (S8), view 11 (S11), and view 13 (S13) are generated by using bi-directional inter-view prediction.

Figure 1C:
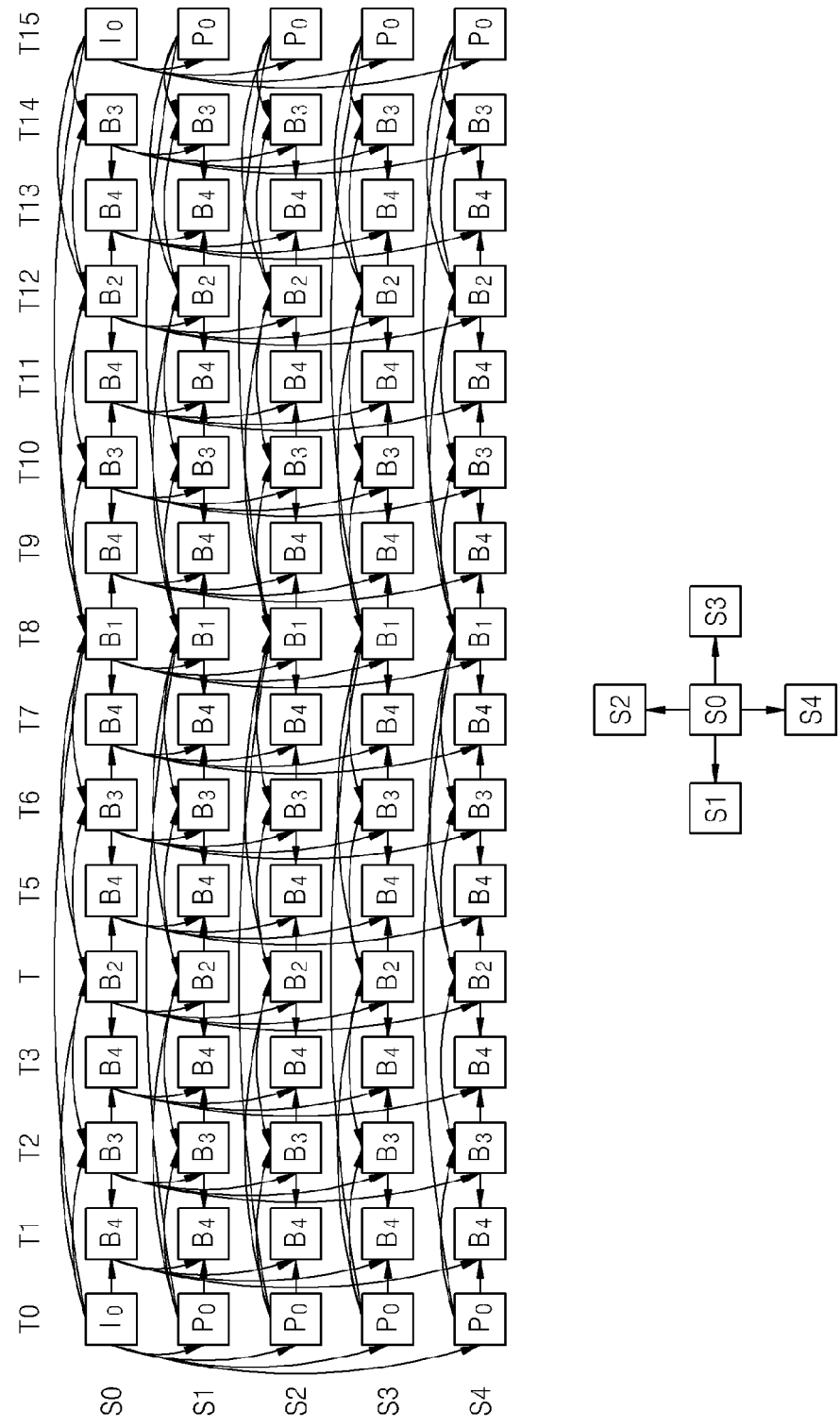
FIG. 1C is a diagram illustrating a multi-view image sequence of an ordinary MVC standard in a cross-type camera array structure according to the related art.

FIG. 1C is a diagram illustrating an ordinary multi-view image sequence in a cross-type camera array structure according to the related art. For example, in the cross-type camera array structure, five cameras may generate cross-type views.

Here, view 1 (S1) and view 2 (S2) can be a stereo pair. However, view 1 (S1) and view 6 (S6) cannot be a stereo pair. In this case, view 1 (S1) and view 6 (S6) are a vertical pair set.

Referring to FIG. IC, P pictures of the images of view 1 (S1), view 2 (S2), view 3 (S3), view 4 (S4), and view 5 (S5) are generated by using uni-directional inter-view prediction.

Prediction of each of the first pictures is performed based on an intra picture generated in relation to an image of a basic view.

Figure 2A:
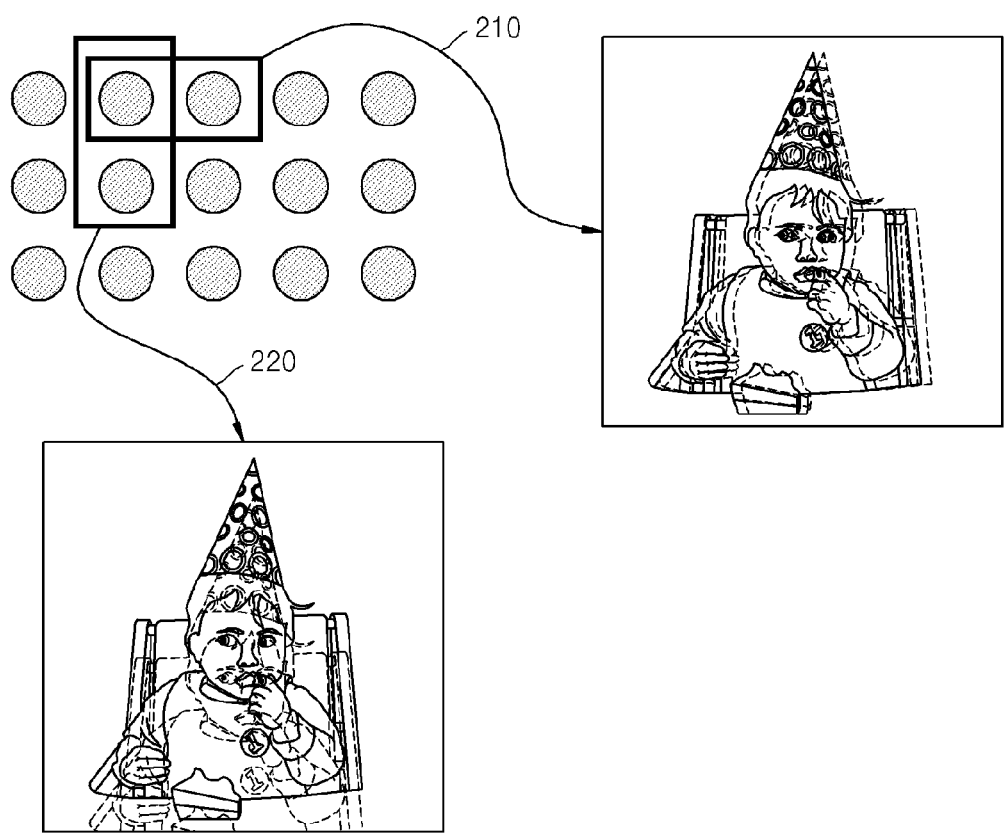
FIGS. 2A and 2B are diagrams illustrating a stereo effect obtained by selecting two views when a stereo image is formed by 2D parallel camera views according to the related art.
Figure 2B:
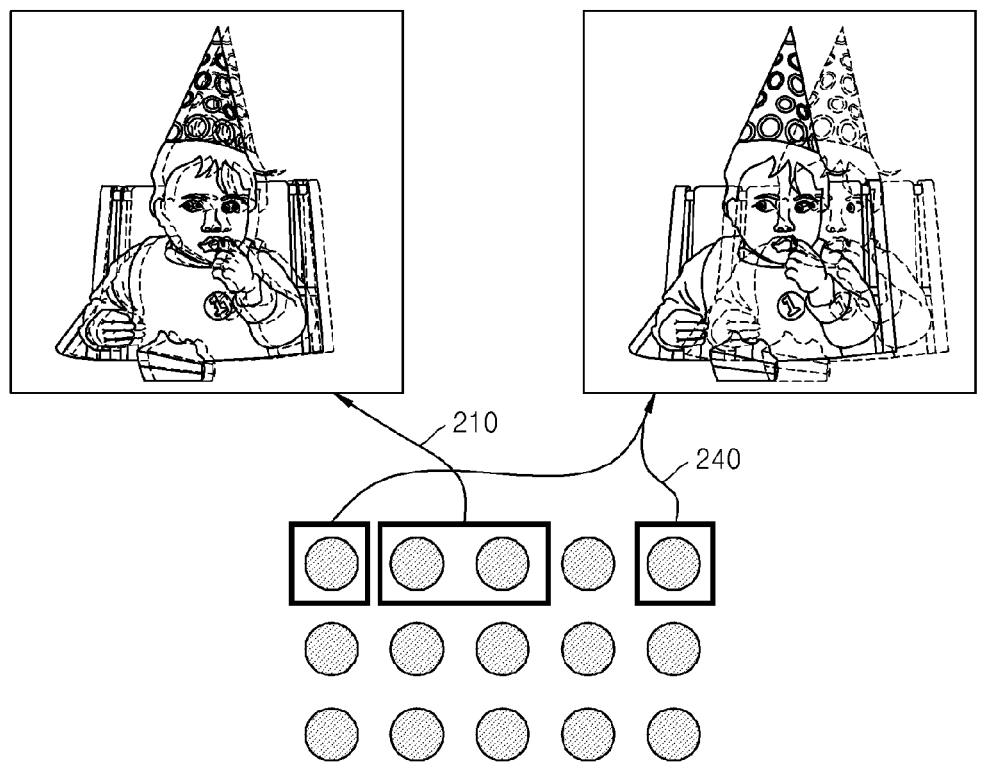

FIGS. 2A and 2B are diagrams illustrating a stereo effect obtained by selecting two views from 2D parallel camera views according to the related art. FIGS. 2A and 2B illustrate embodiments of an enabled/disabled stereo pair set.

In general, a pair of images in which the left view and the right view have a proper distance from each other is effective for a stereo image. That is, when a stereo pair 210 is formed by using neighboring horizontal views as illustrated in FIG. 2A, the display apparatus can maximize the stereo effect because of the close distance.

However, even though information on neighboring views exists, a stereo effect cannot be achieved between views which are vertically positioned. That is, as illustrated in FIG. 2A, when a stereo pair 220 is formed by using views which are vertically positioned, the display apparatus cannot maximize the stereo effect due to the difference between the top view and the bottom view.

In addition, in order to obtain a stereo effect, the distance between the left view and the right view of an image pair cannot be too great. That is, as illustrated in FIG. 2B, when a stereo pair 240 is formed by using horizontal views positioned too far from each other, the display apparatus cannot maximize the stereo effect because the distance is too great. Stereo pairs that are positioned too far apart can be excluded from the stereo pair set.

Accordingly, exemplary embodiments of the present invention provides syntax and semantics for describing enabled stereo pair information to a decoder.

Figure 3:
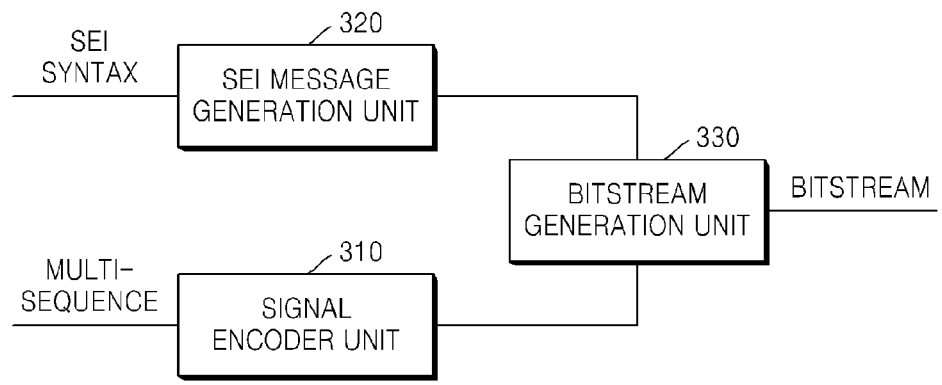
FIG. 3 is a block diagram of an apparatus for encoding a multi-view image according to an exemplary embodiment of the present invention.

FIG. 3 is a block diagram of an apparatus for encoding a multi-view image according to an exemplary embodiment of the present invention.

The apparatus for encoding a multi-view image according to an exemplary embodiment is comprised of a signal encoder unit 310, a supplemental enhancement information (SEI) message generation unit 320, and a bitstream generation unit 330.

The signal encoder unit 310 performs inter-view prediction, as illustrated in FIGS. 1A through 1C, on a multi-view image signal which is generated by a plurality of cameras by using a multi-view compression algorithm, and encodes the predicted multi-sequence image signal. The signal encoder unit 310 compresses the multi-view image signal using a multi-view signal compression method, which is usually used in an H.264 or MVC codec method, and encodes the compressed multi-view image signal and view information.

The SEI message generation unit 320 generates an SEI syntax and semantic message which is usually used in the H.264 and MVC codecs. In this case, the SEI message includes enabled stereo pair information in relation to the multi-view images.

The bitstream generation unit 330 generates a bitstream of a predetermined transmission unit, by using the view information and the multi-view image encoded in the signal encoder unit 310, and the enabled stereo pair information generated in the SEI message generation unit 320. That is, the encoded multi-view image and the SEI message are generated as a series of network abstraction layer (NAL) units.

Figure 4:
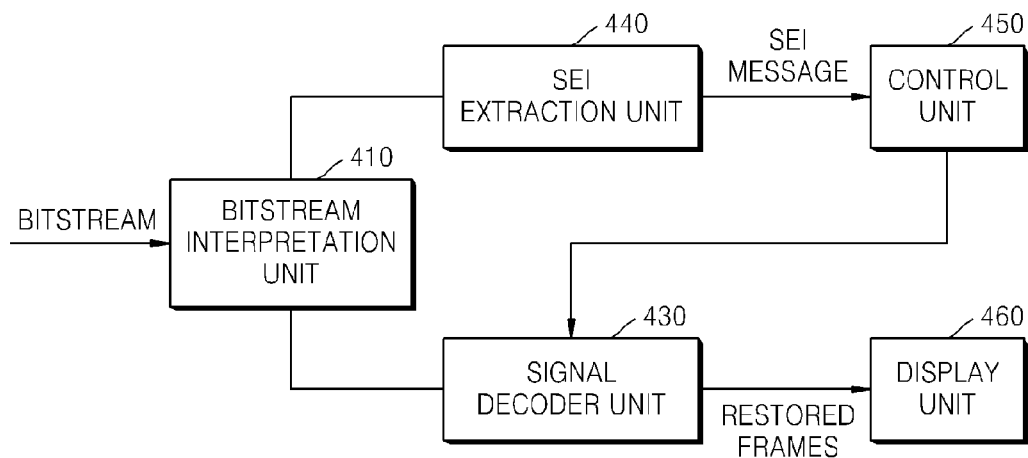
FIG. 4 is a block diagram of an apparatus for decoding a multi-view image according to an exemplary embodiment of the present invention.

FIG. 4 is a block diagram of an apparatus for decoding a multi-view image according to an exemplary embodiment of the present invention.

The apparatus for decoding a multi-view image according to an exemplary embodiment is composed of a bitstream interpretation unit 410, a signal decoder unit 430, an SEI extraction unit 440, a control unit 450, and a display unit 460.

The bitstream interpretation unit 410 separates an NAL header part and a data part from a bitstream received from an apparatus for encoding a multi-view image.

The SEI extraction unit 440 extracts SEI information from the NAL header part separated by the bitstream interpretation unit 410, thereby extracting SEI message syntax and semantic information. In this case, the SEI message syntax and semantic information includes user table information indicating whether or not a stereo pair is formed.

The signal decoder unit 430 decodes view information and a multi-view image signal related to a selected view, by using a multi-view signal decoding method which is usually used by the H.264 and MVC codec methods. In this case, the signal decoder unit 430 decodes view images related to enabled stereo pair information, by using encoding information and view information of a sequence parameter set (SPS) extracted from the NAL header.

The control unit 450 detects enabled stereo pair information in relation to multi-view images from the SEI message extracted by the SEI extraction unit 440, and provides a view selection signal corresponding to the stereo pair information to the signal decoder unit 430. In this case, although not shown, the control unit 450 provides encoding information included in the SPS of the NAL header, to the decoder unit 430.

The display unit 460 displays the image signal of the views restored in the signal decoder unit 430, on a liquid crystal display (LCD).

Figure 5:
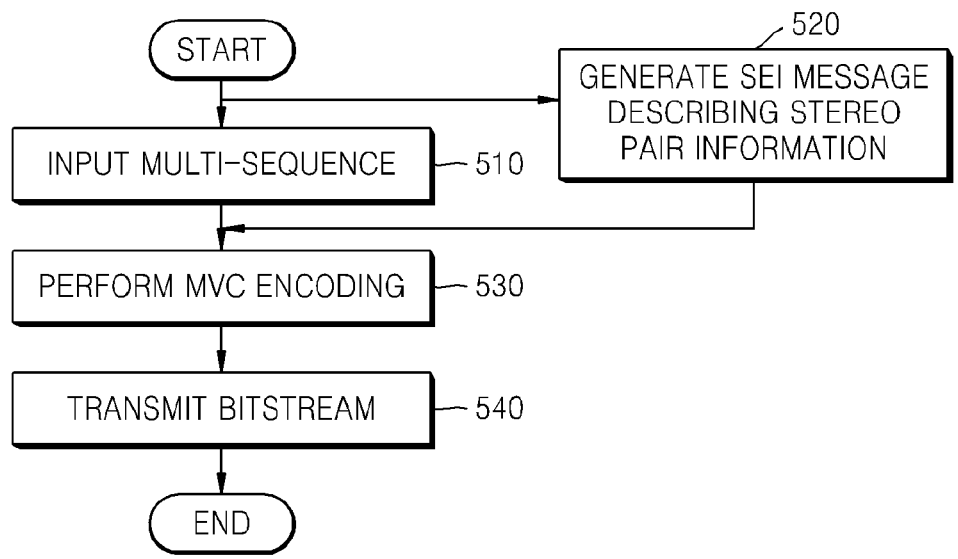
FIG. 5 is a flowchart illustrating a method of encoding a multi-view image according to an exemplary embodiment of the present invention.

FIG. 5 is a flowchart illustrating a method of encoding a multi-view image according to an exemplary embodiment of the present invention.

First, an image signal of a multi-view sequence is input and compressed by a compression algorithm of the H.264 or MVC codec in operation 510.

Then, an enabled stereo pair for each of multi-view images is specified, and by using the specified stereo pair, an SEI message is generated in operation 520.

By encoding the compressed multi-view image and view information, and the enabled stereo pair setting message, a bitstream of a predetermined transmission unit is generated.

Then, the multi-view image stream, the view information stream, and the enabled stereo pair setting message may be packetized in a variety of ways according to a conventional multi-view transmission method in operation 530, and then, transmitted in operation 540.

In an exemplary embodiment, packets may be generated in the form of an NAL unit and then, transmitted to the decoder.

Figure 6:
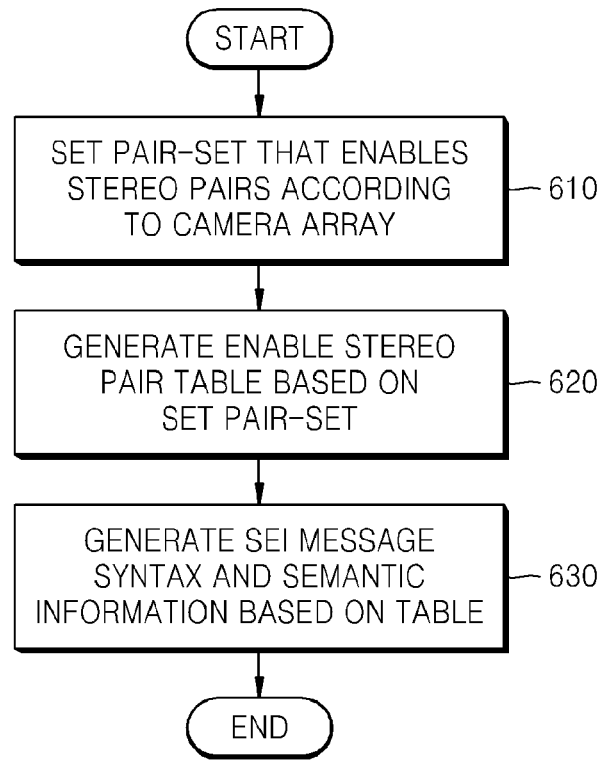
FIG. 6 is a flowchart illustrating a method of generating a supplemental enhancement information (SEI) message illustrated in FIG. 5 according to an exemplary embodiment of the present invention.

FIG. 6 is a flowchart illustrating a method of generating the SEI message illustrated in FIG. 5 according to an exemplary embodiment of the present invention.

First, according to the array of cameras (views), a view pair-set that enables stereo pairs is set in advance in operation 610. For example, a pair of images in which the left view and the right view have a proper distance from each other, is effective for a stereo image. Accordingly, a pair of neighboring horizontal views is set as an enabled stereo pair. However, a view pair in which views are distant from each other is set as a disabling stereo pair. Also, a stereo effect cannot be obtained from views vertically positioned. Accordingly, a view pair of the views vertically positioned is set as a disabling stereo pair.

Then, an enabled stereo pair table based on the set view pair-set is generated in operation 620.

Based on the enabled stereo pair table, syntax and semantic information describing enabled stereo pair information is generated in operation 630.

FIG. 7 is a diagram illustrating syntax of an ordinary NAL unit according to an exemplary embodiment of the present invention.

Referring to FIG. 7, the NAL unit is basically composed of an NAL header and a raw byte sequence payload (RBSP). The NAL header includes flag information (nal_ref_ide) indicating whether or not a slice which becomes a reference picture of the NAL unit is included, and an identifier (nal_unit_type) indicating the type of the NAL unit.

In order to express the length of the RBSP as a multiple of 8 bits, RBSP trailing bits of 1-8 bits are added at the end of the RBSP. Also, the length of the NAL header is 8 bits, and the length of the NAL unit is also a multiple of 8 bits.

FIG. 8 is a diagram illustrating types of the NAL unit illustrated in FIG. 7 according to an exemplary embodiment of the present invention.

Referring to FIG. 8, NAL unit types are formed by an SPS, a picture parameter set (PPS), SEI, and so on. Here, only the SPS, PPS, and SEI that are related to the present invention will now be explained.

The SPS is header information, including information which relates to encoding an entire sequence, such as a profile and a level.

The PPS is header information indicating the encoding mode (for example, an entropy encoding mode, an initial value of a quantization parameter in units of pictures, etc.) of the entire picture.

The SEI indicates additional information which is not essential for the decoding process of a video coding layer (VCL). For example, the SEI includes timing information of each picture related to a hypothetical reference decoder (HRD), information on a pan and/or scan function, information used for random access, and information which a user independently defines (user data information). In the present invention, syntax and semantic information describing enabled stereo pair information is described in the SEI.

Figures 9, 10:
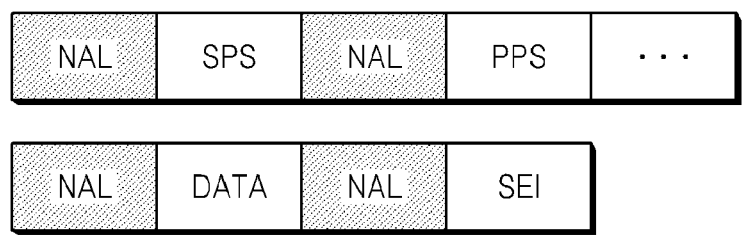
FIG. 9 is a diagram illustrating SEI message syntax which is usually used according to an exemplary embodiment of the present invention.
FIG. 10 is a diagram illustrating a structure of a bitstream which is transmitted by an apparatus for encoding a multi-view image according to an exemplary embodiment of the present invention.

FIG. 9 is a diagram illustrating an SEI message syntax which is usually used according to an exemplary embodiment of the present invention.

Referring to FIG. 9, the SEI message syntax describes the type and length of a message. Accordingly, syntax and semantic information describing enabled stereo pair information is defined in the SEI message.

FIG. 10 is a diagram illustrating a structure of a bitstream which is transmitted by an apparatus for encoding a multi-view image according to an exemplary embodiment of the present invention.

Referring to FIG. 10, an NAL unit formed by an NAL header and SEI is transmitted to a decoder apparatus.

FIG. 11A is a diagram illustrating an SEI message syntax in which a stereo-pair image is set according to an exemplary embodiment of the present invention.

Referring to FIG. 11A, "num_views minus_1" indicates the number of entire encoded views in a bitstream, and "enable stereo pair flag[i][j]" indicates whether or not a left view image and a right view image can form a stereo pair.

FIG. 11B is a diagram illustrating SEI message semantic information for setting a stereo-pair image according to an exemplary embodiment of the present invention.

Information transmitted through an SEI message is related to an access unit. The SEI message appears before a coded slice NAL unit or a coded slice data partition NAL unit of a corresponding access unit.

Referring to FIG. 11B, "enable stereo pair flag[i][j]" indicates whether a stereo pair can be formed, when the left image is view_id[i] and the right image is view_id[j]. The view_id is fetched from an SPS. In this case, the view_id indicates a view identifier (ID) of a view.

"enable stereo pair flag[i][j]", such as "1" indicates an enabled stereo pair. [i] denotes left view_id and [j] denotes right view_id. view_id is the same as view_id[i] in SPS. Also, "enable stereo pair flag[i][j]", such as "0" indicates a disable stereo pair. "enable stereo pair flag[i][j]", such as "0" includes a vertical pair, a long distance pair, and a left and right view case, which is the same as a left and right view false.

Figures 12A, 12B:
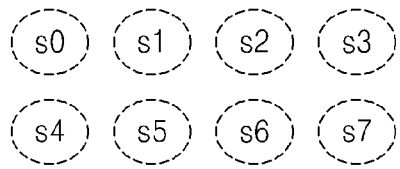
FIG. 12A is a diagram illustrating an enabled stereo-pair image table according to an exemplary embodiment of the present invention.
FIG. 12B is a diagram illustrating an example of a 4 by 2 camera array structure.

FIG. 12A is a diagram illustrating an enabled stereo-pair image table according to an exemplary embodiment of the present invention.

FIG. 12B is a diagram illustrating an example of a 4 by 2 camera array structure.

The stereo-pair image table illustrated in FIG. 12A forms enabled stereo pairs with a 2D camera array of 4 by 2.

Referring to FIG. 12A, according to a vertical and/or horizontal array of cameras, a view pair-set that enables stereo pairs is input to the view_id[i] and view_id[j]. Then, according to the values of the view_id[i] and view_id[j], a flag value indicating whether or not a stereo pair can be formed is generated. A true flag denotes an enabled stereo pair having view_id(0,1), (0, 2), (1, 2), (1, 3). Referring to FIG. 12, view 0 (S0) and view 1 (S1), view 0 (S0) and view 2 (S2), view 1 (S1) and view 2 (S2), and view 1 (S1) and view 3 (S3) can be stereo pairs.

For example, if the view_id[i] is "0" and view_id[j] is "1", the pair has neighboring horizontal views, and therefore it is possible to form a stereo pair. Accordingly, the flag value for the view_id[0] and view_id[1] is true(1).

If the view_id[i] is "0" and view_id[j] is "2", the pair has horizontal views with a close distance, and therefore it is possible to form a stereo pair. Accordingly, the flag value for the view_id[0] and view_id[2] is true(1).

However, if the view_id[i] is "0" and view_id[1] is "3", the pair has horizontal views with a far distance, and therefore it is impossible to form of a stereo pair. Accordingly, the flag value for the view_id[0] and view_id[3] is false(0).

Also, if the view_id[i] is "0" and view_id[j] is "4", the pair has views vertically positioned, and therefore it is possible to form a stereo pair. Accordingly, the flag value for the view_id[0] and view_id[3] is false(0).

FIG. 13 is a conceptual diagram illustrating a multi-view image display according to an exemplary embodiment of the present invention.

Referring to FIG. 13, a multi-view image signal which is generated by 8 cameras is encoded, thereby generating a bitstream.

A display apparatus may display one view or multiple views (n views) according to a view mode which the display apparatus supports.

Figure 14:
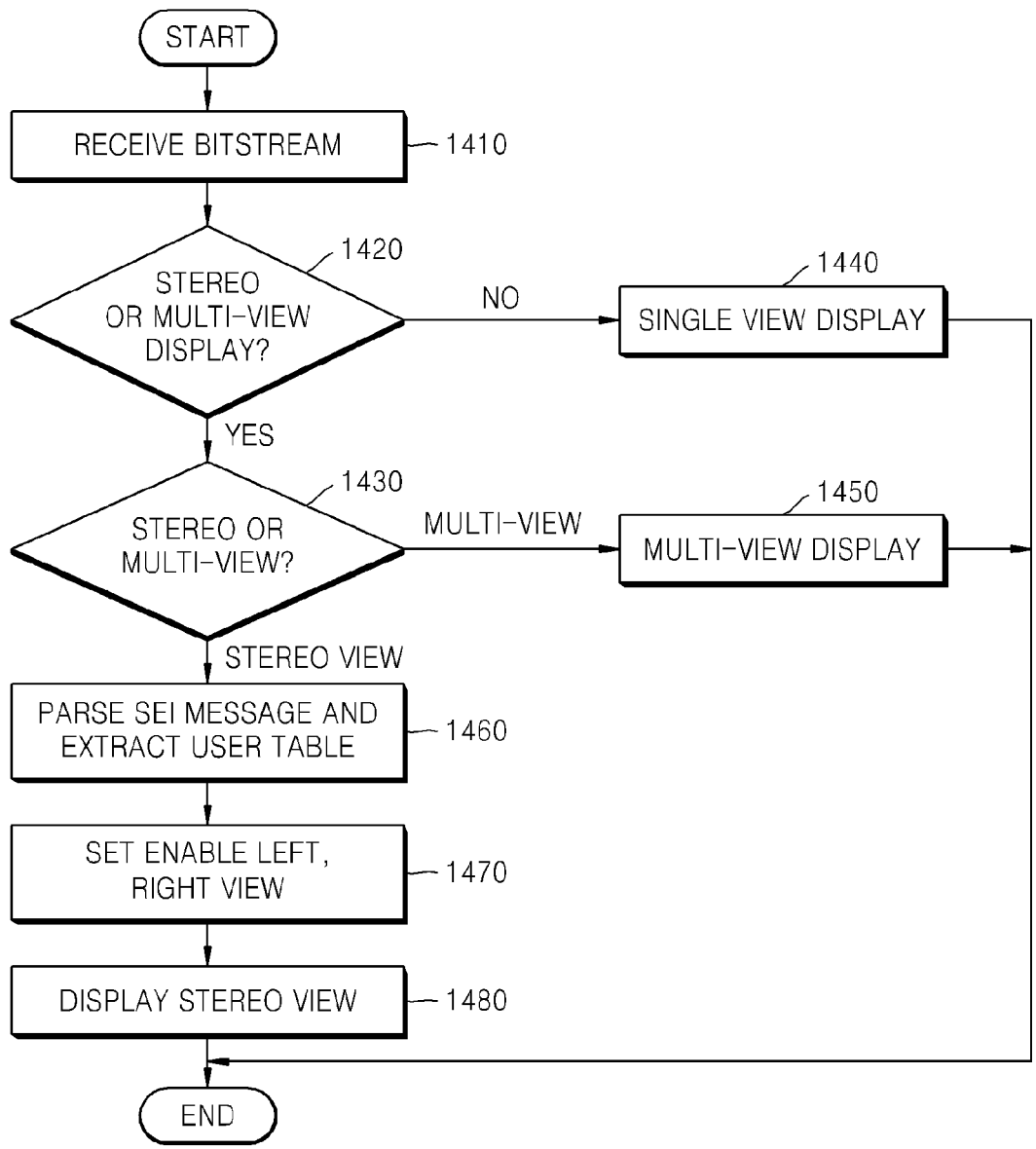
FIG. 14 is a flowchart illustrating a method of decoding and/or displaying a multi-view image according to an exemplary embodiment of the present invention.

FIG. 14 is a flowchart illustrating a method of decoding and/or displaying a multi-view image according to an exemplary embodiment of the present invention.

A bitstream in units of NALs is received from an apparatus for encoding a multi-view image in operation 1410.

Then, whether a display apparatus supports stereo view or multi-view displaying is determined in operation 1420. In an exemplary embodiment, if the stereo or multi-view displaying is not supported, the display apparatus performs single view displaying in operation 1430.

Then, if the stereo or multi-view displaying is supported, the display apparatus determines whether the operation mode is a stereo view mode or a multi-view mode in operation 1440.

In an exemplary embodiment, if the display apparatus is in a multi-view mode, a multi-view is displayed in operation 1450.

If the display apparatus is in a stereo view mode, an SEI message is parsed from the bitstream and a user table is extracted in operation 1460. In an exemplary embodiment, the user table stores a pair-set that enables stereo pairs.

Then, by using the user table, enable left and right view images are set in operation 1470. In an exemplary embodiment, the display apparatus may display the user table storing the stereo pairs, in the form of graphics on the screen so that the user can select an enabled stereo view pair, or the display apparatus may automatically specify an enabled stereo view pair.

Then, by using the set left and right view images, decoding of related view images is performed according to a multi-view image decoding standard, and the decoded stereo view is displayed in operation 1480.

Accordingly, the display apparatus can form a stereo image, by displaying only the enabled view set by using the enabled stereo pair information.

For example, it is assumed that in a 1D camera array structure, eight cameras for eight views exist. In this case, if the enabled stereo pair information in an SEI message indicates that a left image is a 0-th view and a right image is a 1-st view, images related to only the 0-th view and the 1-st view are decoded.

According to the present invention as previously described, enabled stereo pair information is described in an SEI message of a video compression standard, such as the H.264 and MVC codecs, thereby forming an effective stereo image in a display apparatus. When a decoder includes stereo pair set information, the display apparatus can easily set a stereo display.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding a multi-view image, the method comprising:
    compressing a multi-view image based on a reference image relative to multiple views;
    generating enabled stereo pair information in relation to the multi-view image; and
    generating a bitstream using the compressed multi-view image and the enabled stereo pair information.

2. The method of claim 1, wherein the generating enabled stereo pair information comprises:
    setting a pair-set that enables stereo pairs according to a view array;
    generating an enabled stereo pair table based on the set pair-set;
    generating a syntax describing the enabled stereo pair information based on the enabled stereo pair table; and
    recording the syntax describing the enabled stereo pair information in a user-defined message.

3. The method of claim 2, wherein the syntax describing the enabled stereo pair information is included in a supplemental enhancement information (SEI) message of a multi-view image compression standard.

4. The method of claim 2, wherein in the setting the pair-set, a flag value indicating whether the enabled stereo pair can be formed is set.

5. The method of claim 2, further comprising generating semantic information describing the enabled stereo pair information.

6. A method of decoding a multi-view image, the method comprising:
    extracting compression data and a user-defined information message from a bitstream;
    decoding a multi-view image from the compression data, and extracting enabled stereo pair information from the user-defined information message; and
    selecting a view image corresponding to the extracted enabled stereo view pair, and decoding the selected stereo views.

7. The method of claim 6, wherein the user-defined information message is a supplemental enhancement information (SEI) message.

8. The method of claim 6, wherein in the extracting the enabled stereo pair information, a syntax describing the enabled stereo pair information is extracted from the SEI message.

9. The method of claim 6, wherein in the selecting the view image, a view-pair enabled stereo views is selected with reference to an enabled stereo pair table which is generated in advance.

10. A method of displaying a multi-view image, the method comprising:
    determining whether a display mode is a stereo view display mode;
    extracting a user-defined message from a received bitstream if the display mode is the stereo view mode;
    detecting information on a pair-set that enables stereo pairs from the user-defined message;
    setting a stereo image from the information on the pair-set that enables stereo pairs; and
    decoding the stereo image of the pair-set according to a multi-view decoding algorithm, and displaying the decoded stereo view.

11. The method of claim 10, further comprising displaying the information on the pair-set that enables the stereo pairs.

12. The method of claim 10, wherein the user-defined message is a supplemental enhancement information (SEI) message in a network abstraction layer (NAL) header.

13. The method of claim 10, wherein in the decoding the stereo image, an image of a view is decoded according to the multi-view decoding algorithm with reference to the information on the pair-set that enables the stereo pairs.

14. A method of encoding and decoding a multi-view image, the method comprising:
    compressing a multi-view image based on a reference image relative to multiple views;
    generating enabled stereo pair information in relation to the multi-view images;
    generating a bitstream by encoding the compressed multi-view image and the enabled stereo pair information;
    extracting compression data and a user-defined information message from the bitstream;
    decoding the multi-view image from the compression data, and extracting the enabled stereo pair information from the user-defined information message; and selecting a view image corresponding to the extracted enabled stereo pair information, and displaying the selected view image.

15. The method of claim 14, wherein the stereo pair information is included in a supplemental enhancement information (SEI) message of a network abstraction layer (NAL) unit.

16. An apparatus for encoding a multi-view image, the apparatus comprising:
a signal encoder unit which compresses a multi-view image by using a multi-view compression algorithm, and encodes the compressed multi-view image signal;
a supplemental enhancement information (SEI) message generation unit which generates enabled stereo pair information of the multi-view image, and generates syntax of an SEI message which describes the enabled stereo pair information; and
a bitstream generation unit which generates a bitstream using the multi-view image encoded in the signal encoder unit and the enabled stereo pair information generated in the SEI message generation unit.

17. The apparatus of claim 16, wherein the SEI message generation unit has an enabled stereo pair table which describes an enabled stereo pair-set according to a view array.

18. The apparatus of claim 16, wherein an enabled stereo pair table has flag values which indicates whether stereo pairs can be formed.

19. An apparatus for decoding a multi-view image, the apparatus comprising:
a bitstream interpretation unit which separates a network abstraction layer (NAL) header part and a data part from a bitstream;
a supplemental enhancement information (SEI) extraction unit which extracts an SEI message from the NAL header part separated by the bitstream interpretation unit;
a signal decoder unit which decodes a multi-view image signal related to a selected view, by using a multi-view signal decoding method; and
a control unit which detects enabled stereo pair information in relation to multi-view images from the SEI message extracted by the SEI extraction unit, and provides a view selection signal which corresponds to the stereo pair information to the signal decoder unit.

20. The apparatus of claim 19, wherein the enabled stereo pair information is an enabled stereo pair table which describes an enabled stereo pair-set according to a view array.

21. The apparatus of claim 19, further comprising a display unit which displays the multi-view image signal related to the selected view decoded by the signal decoder unit.

22. A non-transitory computer readable recording medium having embodied thereon a computer program for executing a method of encoding a multi-view image, wherein the method comprises:
compressing a multi-view image based on a reference image relative to multiple views;
generating enabled stereo pair information in relation to the multi-view image; and
generating a bitstream by encoding the compressed multi-view image and the enabled stereo pair information.

* * * * *